(12) United States Patent
Liu

(10) Patent No.: US 10,923,940 B2
(45) Date of Patent: Feb. 16, 2021

(54) CHARGER POWER SUPPLY PERFORMING CONSTANT-CURRENT AND CONSTANT-VOLTAGE CHARGING PROCESS SUCCESSIVELY AND METHOD FOR CONTROLLING THE SAME

(71) Applicant: Silergy Semiconductor Technology (Hangzhou) Ltd., Hangzhou (CN)

(72) Inventor: Lili Liu, Hangzhou (CN)

(73) Assignee: SILERGY SEMICONDUCTOR TECHNOLOGY (HANGZHOU) LTD., Hangzhou (CN)

( * ) Notice: Subject to any disclaimer, the term of this patent is extended or adjusted under 35 U.S.C. 154(b) by 368 days.

(21) Appl. No.: 15/349,311

(22) Filed: Nov. 11, 2016

(65) Prior Publication Data

US 2017/0133871 A1 May 11, 2017

(30) Foreign Application Priority Data

Nov. 11, 2015 (CN) .......................... 2015 1 0767739

(51) Int. Cl.
*H02J 7/00* (2006.01)
*H02J 7/04* (2006.01)

(52) U.S. Cl.
CPC .............. *H02J 7/045* (2013.01); *H02J 7/007* (2013.01); *H02J 7/0071* (2020.01);
(Continued)

(58) Field of Classification Search
CPC .... H02J 7/045; H02J 7/04; H02J 7/007; H02J 7/041; H02J 7/0073; H02J 7/0072;
(Continued)

(56) References Cited

U.S. PATENT DOCUMENTS 6,094,034 A * 7/2000 Matsuura ............. H02J 7/00711
320/134
6,100,667 A * 8/2000 Mercer ................. H02J 7/0057
320/107

(Continued)

FOREIGN PATENT DOCUMENTS

CN    1845418 A    10/2006
CN  103780096 A     5/2014
(Continued)

OTHER PUBLICATIONS

Office Action from Chinese Patent Application No. 201510767739.X, dated Jun. 2, 2017, 9 pages.

*Primary Examiner* — Richard Isla
*Assistant Examiner* — Manuel Hernandez
(74) *Attorney, Agent, or Firm* — Westman, Champlin & Koehler, P.A.

(57) ABSTRACT

A charger power supply successively performs a constant-current charging process and constant-voltage charging process in accordance with a compensation signal. The process includes a plurality of first time periods during which a first output current is provided and a plurality of second time periods during which a second output current is provided. One of a current feedback loop and a voltage feedback loop is selected by comparing output signals of two loops. The current feedback loop has a first reference voltage compensated by a difference between a first voltage corresponding to a first output voltage during the plurality of first time periods and a second voltage corresponding to a second output voltage during the plurality of said time periods.

7 Claims, 4 Drawing Sheets

(52) U.S. Cl.
CPC ...... *H02J 7/00712* (2020.01); *H02J 7/00714* (2020.01); *H02J 7/04* (2013.01); *H02J 7/00* (2013.01); *H02J 7/0072* (2013.01)

(58) Field of Classification Search
CPC .. H02J 7/0052; H02J 7/00712; H02J 7/00714; H02J 7/0071; H02J 7/00
USPC .................................. 320/137, 162, 163, 164
See application file for complete search history.

(56) References Cited

U.S. PATENT DOCUMENTS

| | | | |
|---|---|---|---|
| 8,963,485 B2 | 2/2015 | Culp | |
| 9,608,466 B2 | 3/2017 | Liu et al. | |
| 2009/0027011 A1* | 1/2009 | Umetsu | H02J 7/0044 320/145 |
| 2009/0261786 A1* | 10/2009 | Hsu | H02J 7/0072 320/162 |
| 2010/0127670 A1* | 5/2010 | Chen | H02J 7/0081 320/163 |
| 2014/0042959 A1* | 2/2014 | Culp | H02J 7/0077 320/107 |
| 2015/0188329 A1* | 7/2015 | Bradley | G01R 31/3662 320/107 |

FOREIGN PATENT DOCUMENTS

| | | |
|---|---|---|
| CN | 104009529 A | 8/2014 |
| CN | 104065179 A | 9/2014 |
| CN | 104578326 A | 4/2015 |
| CN | 104641531 A | 5/2015 |
| CN | 104682583 A | 6/2015 |
| CN | 104701998 A | 6/2015 |
| CN | 104701999 A | 6/2015 |
| CN | 104753093 A | 7/2015 |

* cited by examiner

CHARGER POWER SUPPLY PERFORMING CONSTANT-CURRENT AND CONSTANT-VOLTAGE CHARGING PROCESS SUCCESSIVELY AND METHOD FOR CONTROLLING THE SAME

CLAIM OF PRIORITY

This application claims priority to Chinese Application No. 201510767739.X, filed on Nov. 11, 2015 (published as CN 105305551 A), which is hereby incorporated by reference.

BACKGROUND OF THE INVENTION

Field of the Invention

The present disclosure relates to the field of power supply, and in particular, to a charger power supply and a method for controlling the same for rechargeable batteries.

Description of the Related Art

In the prior art, a charging process for charging a rechargeable battery typically includes a constant-current charging process and a constant-voltage charging process. At the beginning of the charging process, the constant-current process is performed by applying a constant current which is often relatively large, in order to improve the charging efficiency of the rechargeable battery. The constant-voltage charging process begins when the rechargeable battery is nearly fully charged, for preventing the battery from overcharging. During the charging process, the terminal voltage of the rechargeable battery is monitored and the power supply switches from the constant-current charging process to the constant-voltage charging process in accordance with the terminal voltage.

However, the detected voltage of the rechargeable battery is greater than the actual voltage of the rechargeable battery because of the line impedance of the circuit and internal resistance of the battery. As shown in FIG. 1, an output terminal OUT of a charger power supply IC provides an output voltage Vout for charging, an output capacitor Cout is connected between the output terminal OUT and ground GND, and a rechargeable battery BAT which is serving as a load is connected between the output terminal OUT and ground GND. FIG. 1 also shows an equivalent resistor Rs of the line impedance and an equivalent resistor Rr of the rechargeable battery. In the charger power supply IC, a feedback voltage is obtained at the output terminal OUT and compared with the reference voltage Vref to determine the time point of switching the charging process of the charger power supply. Because of the existence of the line impedance Rs and the internal resistance Rr of the battery, the terminal voltage Vbat of the rechargeable battery is not equal to the voltage Vout at the output terminal OUT, but equal to Vout−Iout*(Rs+Rr), wherein the current Iout is the charging current. If the voltage Vout at the output terminal is the basis for determining the charging state and switching between the charging modes, because there's still voltage difference between the actual terminal voltage and the predetermined value when the detected voltage has already reached the predetermined value, the constant-voltage charging process will need a considerably long constant-voltage charging period to fully charge the rechargeable battery therefore the charging time will be overlong.

Thus, the charger power supply is desired to be further improved to achieve accuracy switching between the charging modes, so that the charging process will become quick and safe thereby saving the charging time.

BRIEF DESCRIPTION OF THE INVENTION

In view of this, the disclosure provides a charger power supply and a method for controlling the same for compensating the line impedance and the internal resistance of battery, so as to realize fast charging.

According to one aspect of the disclosure, there is provided a charger power supply. The charger power supply successively performs a constant-current charging process and a constant-voltage charging process in accordance with a compensation signal. The charger power supply comprises a compensation circuit comprising an input terminal for receiving an output voltage and an output terminal for providing the compensation signal, wherein the compensation circuit obtains a first voltage corresponding to a first output voltage at a constant first output current and a second voltage corresponding to a second output voltage at a constant second output current, respectively, and obtains a compensation voltage in accordance with the difference between the first voltage and the second voltage, and modifies the compensation voltage by use of the compensation signal.

Preferably, the compensation circuit comprises a voltage feedback circuit having a first differential amplifier comprising a non-inverting terminal for receiving a first reference voltage, an inverting input terminal for receiving a third voltage corresponding to the output voltage and an output terminal for providing the compensation signal, the first reference voltage is superimposed on the compensation voltage to obtain a compensation value of the first reference voltage, so that the first differential amplifier receives the compensation value of the first reference voltage at the non-inverting input terminal, or, the compensation voltage is subtracted from the third voltage to obtain a compensation value of the third voltage, which is received at the inverting input terminal of the first differential amplifier.

Preferably, the compensation circuit further comprises a current feedback circuit having a second differential amplifier comprising a non-inverting input terminal for receiving one of a second reference voltage and a third reference voltage, an inverting input terminal for receiving a fourth voltage corresponding to the output current and an output terminal for providing the compensation signal, the second reference voltage and third reference voltage corresponds to the first output current and the second output current, respectively.

Preferably, the compensation circuit further comprises a selection circuit for selecting an output signal with a smaller value from output signals of the first differential amplifier, and the second differential amplifier, as the compensation signal.

Preferably, the compensation circuit further comprises a first diode and a second diode, wherein a cathode of the first diode is connected with the output terminal of the first differential amplifier, a cathode of the second diode is connected with the output terminal of the second differential amplifier, and anodes of the first diode and the second diode are connected together to a common node to provide the compensation signal.

Preferably, the compensation circuit further comprises a voltage sample-hold circuit comprising a first branch circuit which samples and holds the first voltage corresponding to the first output voltage at the constant first output current, and a second branch circuit which samples and holds the second voltage corresponding to the second output voltage at the constant second output current, wherein the first and second branch circuits are both connected to the output terminal of the charger power supply; and a reference voltage superimpose circuit comprising a first voltage-controlled voltage source for obtaining a difference between the first voltage and the second voltage as the compensation voltage, and a second voltage-controlled voltage source for superimposing the first reference voltage on the compensation voltage.

Preferably, the first branch circuit comprises a first switch being connected between the output terminal and a positive input terminal of the first voltage-controlled voltage source, and a first capacitor being connected between the positive input terminal of the first voltage-controlled voltage source and ground, the first capacitor stores the first voltage, the second branch circuit comprises a second switch being connected between the output terminal and a negative input terminal of the first voltage-controlled voltage source, and a second capacitor being connected between the negative input terminal of the second voltage-controlled voltage source and ground, the second capacitor stores the second voltage, the first voltage and the second voltage are respectively received by the positive input terminal and the negative input terminal of the first voltage-controlled voltage source, and a negative output terminal of the first voltage-controlled voltage source is grounded, so that the difference between the first voltage and the second voltage at a positive output terminal is obtained by the first voltage-controlled voltage source, the compensation voltage is received between the positive and negative input terminals of the second voltage-controlled voltage source, and the first reference voltage is received at a negative output terminal of the second voltage-controlled voltage source, so that the compensation value of the first reference voltage is obtained at a positive output terminal of a second voltage-controlled voltage source, the reference voltage superimpose circuit further comprises a third switch being connected between the positive output terminal of the first voltage-controlled voltage source and the positive input terminal of the second voltage-controlled voltage source, and a third capacitor being connected between the positive input terminal and the negative input terminal of the second voltage-controlled voltage source, the third capacitor stores the compensation voltage.

Preferably, the compensation circuit further comprises a voltage sample-hold circuit comprising a first branch circuit which samples and holds the first voltage corresponding to the first output voltage at the constant first output current, and a second branch circuit which samples and holds the second voltage corresponding to the second output voltage at the constant second output current, wherein the first and second branch circuits are both connected to the output terminal of the charger power supply; and an output voltage compensation circuit comprising a first voltage-controlled voltage source for obtaining a difference between the first voltage and the second voltage as the compensation voltage, and a third differential amplifier for subtracting the compensation voltage from the third voltage.

Preferably, the first branch circuit comprises a first switch being connected between the output terminal and a positive input terminal of the first voltage-controlled voltage source, and a first capacitor being connected between a positive input terminal of the first voltage-controlled voltage source and ground, the first capacitor stores the first voltage, the second branch circuit comprises a second switch being connected between the output terminal and a negative input terminal of the first voltage-controlled voltage source, and a second capacitor being connected between a negative input terminal of the second voltage-controlled voltage source and ground, the second capacitor stores the second voltage, the first voltage and the second voltage are respectively received by a positive input terminal and a negative input terminal of the first voltage-controlled voltage source, and a negative output terminal of the first voltage-controlled voltage source is grounded, so that the difference between the first voltage and the second voltage is obtained at the positive output terminal of the first voltage-controlled voltage source, the third differential amplifier receives the third voltage at the non-inverting terminal and the compensation voltage at the inverting terminal, so that the third differential amplifier obtains the compensation value of the third voltage at the output terminal, the reference voltage superimpose circuit further comprises a third switch being connected between the positive output terminal of the first voltage-controlled voltage source and the inverting input terminal of the third differential amplifier, and a third capacitor being connected between the inverting input terminal of the third differential amplifier and ground, the third capacitor stores the compensation voltage.

According to a second aspect of the disclosure, there is provided a control method for the charger power supply configured to successively perform a constant-current charging process and constant-voltage charging processing in accordance with a compensation signal, wherein the constant-current charging process comprises: obtaining a first voltage corresponding to a first output voltage when the charger power supply is being charged at a constant first output current; obtaining a second voltage corresponding to a second output voltage when the charger power supply is being charged at a constant second output current; obtaining a compensation voltage in accordance with the difference between the first voltage and the second voltage; and modifying the compensation signal with the compensation voltage.

Preferably, the time point of the charger power supply switching from the constant-current charging process to the constant-voltage charging process is determined in accordance with the compensation signal having been modified.

Preferably, the value of the output voltage in the constant-voltage charging process is determined in accordance with the compensation signal having been modified.

Preferably, the compensation signal is generated in accordance with a first reference voltage and a third voltage corresponding to the output voltage, the compensation voltage is superimposed on the first reference voltage to obtain a compensation value of the first reference voltage, or the compensation voltage is subtracted from the third voltage to obtain a compensation value of the third voltage.

Preferably, the constant-current charging process comprises a plurality of first time periods during which the first output current is provided and a plurality of second time periods during which the second output current is provided, alternately.

Preferably, the method further comprises storing the first voltage before each of the plurality of first time periods is ended; storing the second voltage before each of the plurality of second time periods is ended; subtracting the second voltage from the first voltage to obtain a difference as the compensation voltage after the first voltage and the second voltage are stored.

The charger power supply and the control method according to the embodiment determines the time point of switching the constant-current charging process to the constant-voltage charging process in accordance with the compensation signal having been modified because the compensation signal is modified with the compensation voltage. With respect to the prior art, the time to reach the reference voltage is increased. The constant-current charging process of the charger power supply continues for longer time than that in the prior art, so that the voltage of the charger power supply is rapidly increased.

Further, the value of the output voltage in the constant-voltage process is determined in accordance with the compensation signal having been modified, which means that the output voltage of the charger power supply in the constant-voltage charging process is greater than that in the prior art. The constant-voltage charging process continues for greatly less time, so that the total charging time is reduced.

The charger power supply and the control method thus realize fast charging by compensating the line impedance and the internal resistance of the battery.

BRIEF DESCRIPTION OF THE DRAWINGS

The above and other objects, advantages and features of the present invention will become more fully understood from the detailed description given herein below in connection with the appended drawings, and wherein.

DETAILED DESCRIPTION OF EMBODIMENTS OF THE INVENTION

Figure 1:
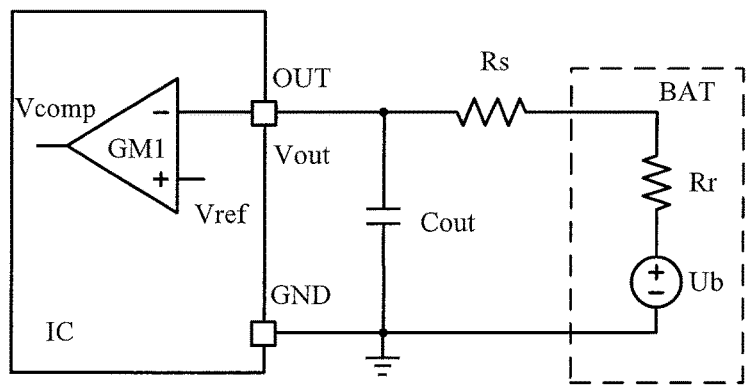
FIG. 1 is a schematic diagram of the operational principle of a charger power supply in the prior art.

Exemplary embodiments of the present disclosure will be described in more details below with reference to the accompanying drawings. In the drawings, like reference numerals indicate like elements.

Some particular details of the present disclosure will be described below, such as specific circuit modules, elements, connection manners, control timing sequence, for better understanding of the present disclosure. However, it can be understood by one skilled person in the art that these details are not always essential for but can be varied in a specific implementation of the disclosure.

The disclosure is based on the knowledge as follows. The charger power supply IC controls the switching time of the charging modes in accordance with the output voltage Vout at the output terminal OUT, the output voltage Vout is not equal to the terminal voltage Vbat between the two terminals of the rechargeable battery. If the charger power supply IC achieves charging control in accordance with the output voltage of the power converter, the constant-current charging mode will be switched to the constant-voltage charging mode prematurely, leading to increased charging time. The terminal voltage Vbat between the two terminals of the rechargeable battery is equal to Vout−Iout*(Rs+Rr), where Iout is an output current of the charger power supply IC and also the charging current of the battery. Only in the case that the output voltage Vout is compensated to be approximately equal to the terminal voltage Vbat between the two terminals of the rechargeable battery, the accuracy charging control may be realized. The compensation of the output voltage is performed by subtracting the compensation voltage from the detected output voltage Vout, or by superimposing the compensation voltage on a reference voltage Vref. In the invention, the term "voltage drop of the line impedance and internal resistance of a battery" refers to the voltage generated by the line impedance and internal resistance of a battery when the output current Iout flows through the rechargeable battery, the compensation circuit refers to the voltage corresponding to the voltage drop across the line impedance and internal resistance of a battery.

The disclosure can be embodied in various forms, some of which will be described below.

Figure 2:
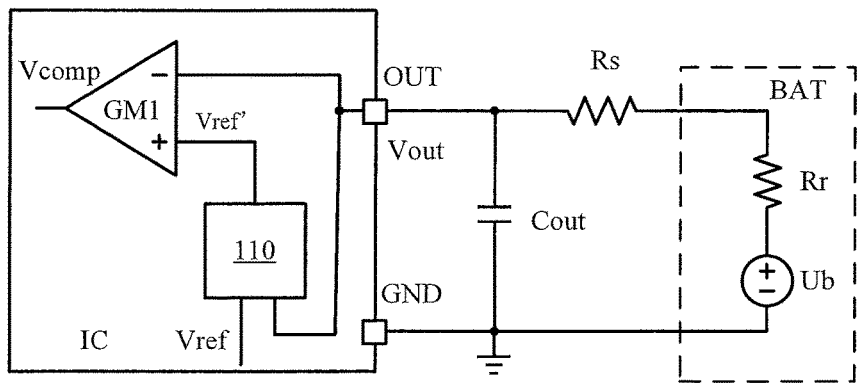
FIG. 2 is a schematic diagram of the operational principle of a charger power supply according to an embodiment of the disclosure.
Figure 3:
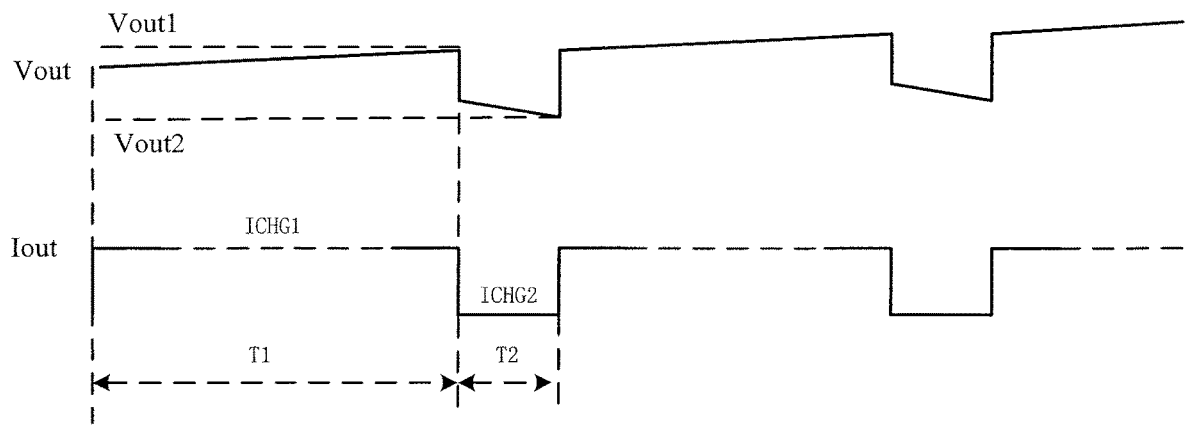
FIG. 3 is a waveform diagram of the operational principle of a charger power supply according to an embodiment of the disclosure.

FIGS. 2 and 3 are a schematic diagram and a waveform diagram of the operational principle of a charger power supply according to an embodiment of the disclosure. In the invention, the charger power supply, which is a power converter as an example, is used for connecting an external power supply and providing the output voltage Vout, so as to provide a charging current for charging the rechargeable battery BAT.

For simplicity, FIG. 2 only shows one part of a feedback circuit of the power converter, without showing the control signal generating circuit, the power stage circuit of the power converter and the other parts of the feedback circuit being connected with the control signal generating circuit. The feedback circuit includes a voltage feedback circuit. The voltage feedback circuit includes a differential amplifier GM1 for generating a compensation signal Vcomp in accordance with the output voltage Vout and the reference voltage Vref. It can be understood that the control signal generating circuit of the power converter receives the compensation signal Vcomp, and provides a PWM signal or a PFM signal, and the control signal generating circuit also provides the output voltage Vout and output current Iout by periodically turning on or off the power stage circuit.

The charger power supply further includes a current detection module and a voltage detection module. It can be understood that the current detection module and voltage detection module of the existing charger power supply can be used in the invention for detecting the output voltage Vout and output current Iout of the charger power supply. Accordingly, in the charger power supply, a voltage feedback signal may be used to represent the output voltage Vout of the charger power supply, and a current feedback signal may be used to represent the output current Iout of the charger power supply. In the invention, the voltage corresponding to the output voltage Vout refers to the output voltage Vout itself or a feedback voltage of the output voltage Vout, the voltage corresponding to the output current Iout refers to a sampling voltage of the output current Iout or a feedback voltage of the output current Iout.

As shown in FIG. 2, an output terminal OUT of a charger power supply IC provides an output voltage Vout for charging, an output capacitor Cout is connected between the output terminal OUT and ground GND, a rechargeable battery BAT which is serving as a load is connected between the output terminal OUT and ground GND. FIG. 2 also shows an equivalent resistor Rs of the line impedance and an equivalent resistor Rr of the rechargeable battery. In the charger power supply IC, the feedback voltage is obtained at the output terminal OUT and compared with the reference voltage Vref to determine the switching time of the charging modes of the charger power supply.

Different from the conventional charger power supply shown in the FIG. 1, the charger power supply in the invention further includes a compensation circuit 110. The compensation circuit 110 is connected in the feedback circuit of the charger power supply IC. In the embodiment, the compensation circuit 110 is used to obtain the compensation voltage of the reference voltage. The compensation voltage is superimposed on the reference voltage Vref.

As shown in FIG. 3, a constant first current ICHG1 is used to charge the rechargeable battery during the time period T1, and the output voltage Vout of the charger power supply gradually increases. The output terminal OUT provides a voltage Vout1 when the first time period T1 is over. A constant second current ICHG2 is used to charge the rechargeable battery during the time period T2. The second current ICHG2 is less than the first current ICHG1. Because of the reduction of the charging current, the output voltage Vout of the charger power supply decreases abruptly at the beginning of the time period T2 and then drops continuously. Vout2 is the voltage at the output terminal OUT when the second time period T2 is over. The first time period T1 is much greater than the second time period T2. In an example, T1=30 ms, T2=0.1 ms.

The terminal voltage Vbat between the two terminals of the rechargeable battery is almost unchanged during the time period T2 in case that T1>>T2 and ICHG1>ICGH2, whereas the voltage across the line impendence Rs and internal resistance Rr changes rapidly during the time period T2. The greater the difference between the first time period T1 and the second time period T2, the more contributions it will make to accurately represent the voltage changes of the line impendence Rs and internal resistance Rr. That is, the value of Vout1−Vout2 is much closer to the value of (ICHG1−ICHG2)*(Rs+Rr). Furthermore, the smaller the second current ICHG2 is, the closer Vout1−Vout2 is to ICHG1*(Rs+Rr). If the second current ICHG2 is equal to zero, then Vout1−Vout2=ICHG1*(Rs+Rr), so as to obtain the compensation voltage Vrc=Vout1−Vout2=ICHG1*(Rs+Rr).

After obtaining the compensation voltage Vrc, the compensation circuit 110 superposes the compensation voltage Vrc on the reference voltage Vref, further obtaining the compensation value Vref' of the reference voltage, that is, Vref'=Vref+Vrc.

The charger power supply successively performs the constant-current charging process and the constant-voltage charging process in accordance with the compensation signal.

The output voltage at the output terminal of the charger power supply gradually increases during the constant-current charging process. The switching timing of the charging modes of the charger power supply is determined in accordance with the compensation value Vref of the reference voltage. The power supply switches from the constant-current charging process to the constant-voltage charging process once the difference between the compensation value Vref of the reference voltage and the voltage Vout at the output terminal is detected to be less than a predetermined value.

During the constant-voltage charging process, the voltage Vout at the output terminal of the charger power supply maintains equal to the compensation value Vref of the reference voltage, and the output current at the output terminal of the charger power supply decreases gradually. Until the charging current is less than a predetermined value which is generally equal to ¹⁄₁₀ of the first charging current, and the output voltage is greater than the difference between the compensation value and a predetermined value, the charging process stops.

By means of the method above, the time point of switching the constant-current charging process to the constant-voltage charging process and the value of the output voltage during the constant-voltage charging process are both determined in accordance with the compensation value Vref which have been modified. Since the compensation voltage Vrc is superimposed on the reference voltage, the detection voltage costs more time to reach the reference value Vref compared with that in the prior art under the condition that other factors are the same. Accordingly, the constant-current charging process of the charger power supply continues for longer time than that in the prior art, therefore the voltage of the charger power supply will be rapidly increased and the duration time of the constant-voltage charging process will be greatly decreased, leading to the reduction of the total charging time.

Figure 4:
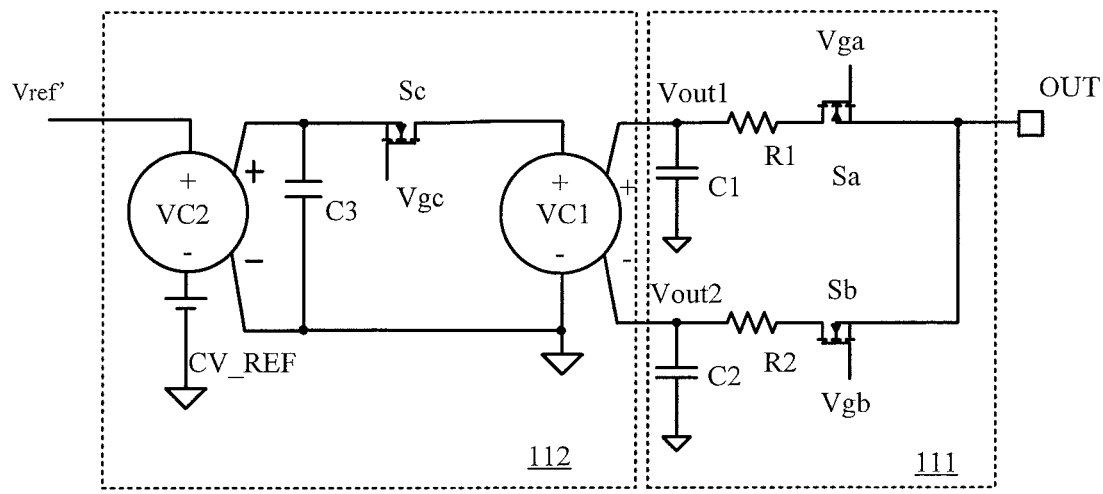
FIGS. 4 and 5 are schematic diagrams respectively showing different parts of a compensation circuit of an example charger power supply according to an embodiment of the disclosure.
Figure 5:
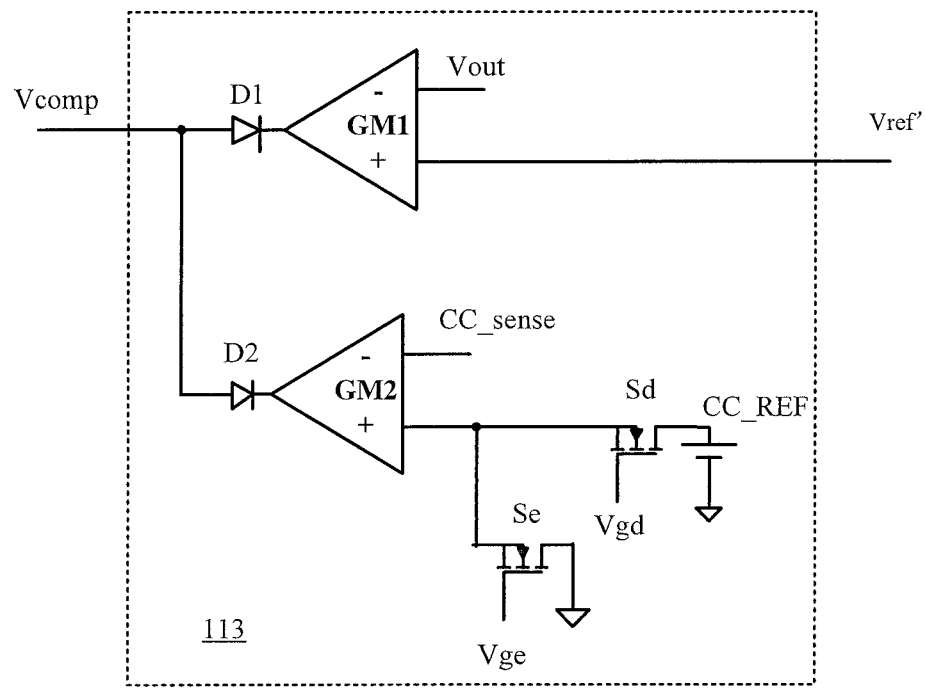

FIGS. 4 and 5 are schematic diagrams respectively showing different parts of a compensation circuit of an example charger power supply according to an embodiment of the disclosure. The compensation circuit 110 includes a voltage sample-hold circuit 111, a reference voltage superimpose circuit 112 and a loop switching control circuit 113.

The voltage sample-hold circuit 111 includes a first branch circuit and a second branch circuit both connected to the output terminal OUT of the charger power supply. The first branch circuit includes a switch Sa and a resistor R1 connected in series from the output terminal OUT, and a capacitor C1 connected between one terminal of the resistor R1 and ground. The second branch circuit includes a switch Sb and a resistor R2 connected in series from the output terminal OUT, and a capacitor C2 connected between one terminal of the resistor R2 and ground. The capacitors C1 and C2 are used to hold the first output voltage Vout1 when the first time period T1 is over and the second output voltage Vout2 when the second time period T2 is over, respectively. In the voltage sample-hold circuit 111, the resistors R1 and R2 are used for damping the fast jump of the voltage and suppressing the interference, the capacitors C1 and C2 are used for holding the sampling voltage.

The reference voltage superimpose circuit 112 includes a first voltage-controlled voltage source VC1, a second voltage-controlled voltage source VC2, a switch Sc and a capacitor C3. The first voltage-controlled voltage source VC1 has a positive input terminal and a negative input terminal for respectively receiving the first output voltage Vout1 and the second output voltage Vout2, so that the voltage between the positive and the negative output terminal of the first voltage-controlled voltage source VC1 is proportional to Vout1−Vout2. The switch Sc has a first terminal being connected with the positive output terminal of the first voltage-controlled voltage source VC1 and a second terminal being connected to the positive input terminal of the second voltage-controlled voltage source VC2. The negative input terminal of the second voltage-controlled voltage source VC2 and the negative output terminal of the first voltage-controlled voltage source VC1 are both grounded. The capacitor C3 is connected between the second terminal of the switch Sc and ground. The negative output terminal of the second voltage-controlled voltage source VC2 is connected to a reference voltage source CV_REF. Accordingly, the second voltage-controlled voltage source VC2 provides the compensation value Vref of the reference voltage at the positive output terminal. In the reference voltage superimpose circuit 112, the capacitor C3 is used to maintain the voltage difference Vout1−Vout2 of the sampling voltage.

The loop switching control circuit 113 includes a voltage feedback loop, a current feedback loop, a selection circuit, a reference voltage selection circuit and a loop selection circuit. The voltage feedback loop includes a first differential amplifier GM1, the current feedback loop includes a second differential amplifier GM2. The non-inverting input terminal of the first differential amplifier GM1 receives the compensation value Vref of the reference voltage at the output terminal of the reference voltage superimpose circuit 112, and the inverting input terminal receives the voltage Vout at the output terminal. The non-inverting input terminal of the second differential amplifier GM2 receives the reference voltage from the reference voltage selection circuit, the inverting input terminal receives a current detecting signal CC_sense which is used for representing the charging current Iout of the output terminal. The reference voltage selection circuit includes a switch Sd, a switch Se and a reference voltage source CC_REF. The non-inverting input terminal of the second differential amplifier GM2 is connected to the reference voltage source CC_REF through the switch Sd, and connected to the ground or another reference voltage source, i.e., a reference of the second current, through the switch Se. The loop selection circuit includes a diode D1 and a diode D2. The cathodes of the diodes D1 and D2 are respectively connected to the output terminals of the first differential amplifier GM1 and second differential amplifier GM2, the anodes are connected with each other, providing the compensation signal Vcomp. The compensation signal Vcomp is determined by the smaller one of the output signals of the first differential amplifier GM1 and the second differential amplifier GM2. Thus, one of the voltage feedback loop and current feedback loop is selected in accordance with the amplitude values of the output signals of the first differential amplifier GM1 and the second differential amplifier GM2.

In the loop switching control circuit 113, the second differential amplifier GM2 is used for calculating the difference between a predetermined reference current and the charging current, whereas the first differential amplifier GM1 is used for calculating the difference between the compensation reference voltage and the voltage at the output terminal of the charger power supply. The diodes being connected with the output terminals of the two differential amplifiers constitute the selection circuit, the smaller one of the output values of the differential amplifiers is served as the compensation signal Vcomp.

According to an embodiment, for example, the charger power supply is a power converter. It can be understood that the control signal generating circuit of the power converter receives the compensation signal Vcomp, provides a PWM signal or a PFM signal, and it also provides the output voltage Vout and output current Iout by periodically turning the main power switch of the power converter on or off.

Figure 6:
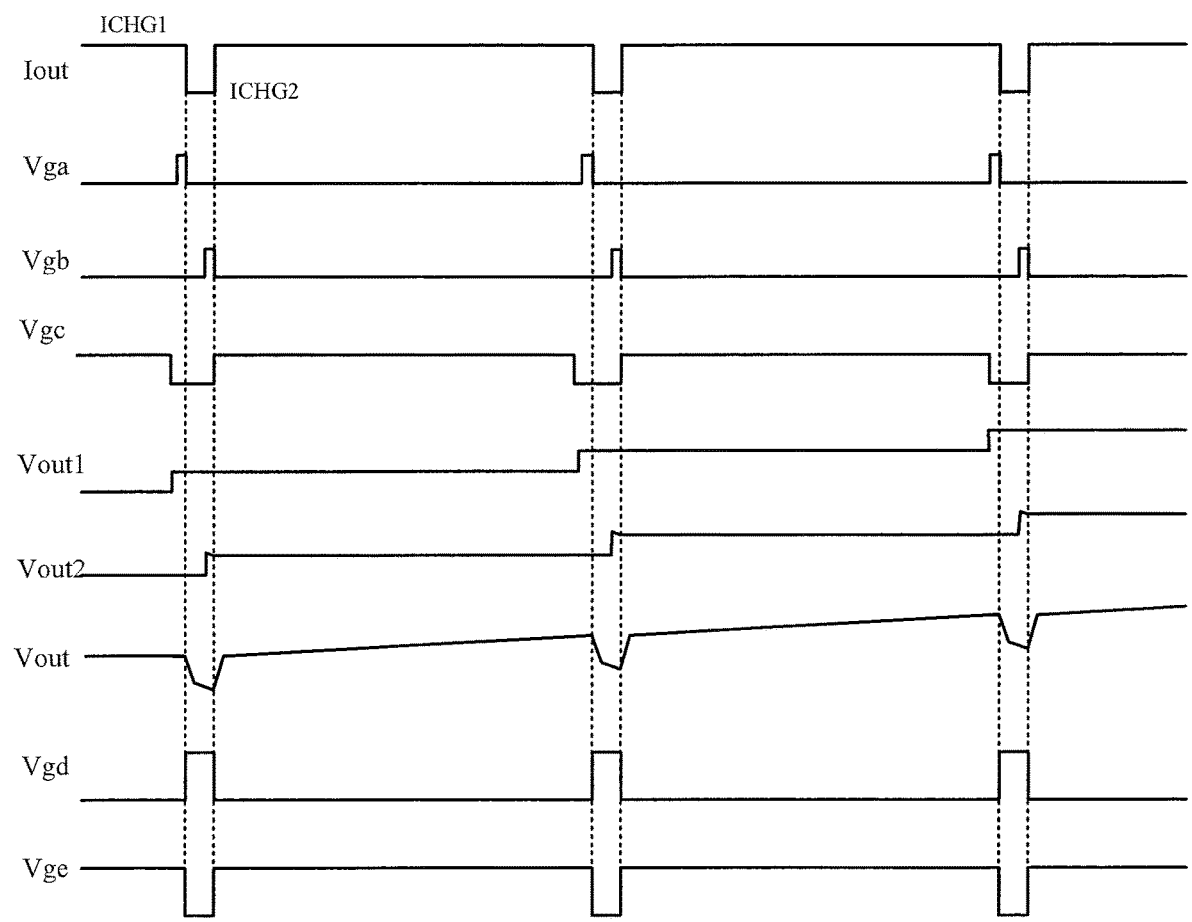
FIG. 6 is a waveform diagram of a compensation circuit of an example charger power supply according to an embodiment of the disclosure.

FIG. 6 is a waveform diagram of a compensation circuit of an example charger power supply according to an embodiment of the disclosure. The compensation circuit operates as the waveform diagram shown in FIG. 6 to obtain the compensation value of the reference voltage during the constant-current charging process of the charger power supply.

The constant-current charging process includes a plurality of first time periods T1 and second time periods T2, which are repeatedly performed. The output voltage of the charger power supply is relative small during the constant-current charging process, the loop switching control circuit 113 connects the current feedback loop to the feedback loop, thus achieving charging by the constant current.

As shown in FIG. 6, the output current Iout respectively equals to the current values ICHG1 and ICHG2 during the time period T1 and the time period T2. During the time period T1, the first current ICHG1 is used for charging the rechargeable battery, and during the second time period T2, the second current ICHG2 is used for charging the rechargeable battery.

The switches Sa to Se of the compensation circuit 110 are turned on or off respectively by the control signals Vga to Vge, whereby the control signal Vga is generated by triggering the control signal Vgd to turn on the switch Sa in the time period ΔT1, therefore the first output voltage Vout1 is obtained by sampling, the control signal Vgb is generated by triggering the control signal Vge to turn on the switch Sa in the time period ΔT2, therefore the second output voltage Vout2 is obtained by sampling. The control signal Vgc is generated by triggering the control signals Vga and Vgb, so that the switch Sc is turned off during the time period of the ΔT1 to the ending time of time period T2.

In the loop switching control circuit 113, the switches Sd and Se are alternatively turned on and off during the time periods T1 and T2, in order to realize the constant-current charging at different current values during the time periods T1 and T2. When the switch Sd is turned on, the reference voltage selection circuit selects the reference voltage source CC_REF to provide a first reference voltage, when the switch Se is turned on, the reference voltage selection circuit selects zero voltage as the second reference voltage. Correspondingly, the charger power supply provides a constant output current, that is, the first current ICHG1 and the second current ICHG2 are corresponding to the first and second voltages, respectively. Because the second reference voltage is zero voltage, the value of the second current ICHG2 provided by the charger power supply is also zero.

At the ending time of the first time period T1, that is, during the time period ΔT1 prior before the first time period T1 ends, the voltage sample-hold circuit 111 operates and the switch Sa is turned on, so that the first output voltage Vout1 of the output terminal of the charger power supply is obtained. Then, the switch Sa is turned off, and the capacitor C1 maintains the first output voltage Vout1 unchanged.

At the ending time of the second time period T2, that is, during the time period ΔT2 prior before the first time period T2 ends, the voltage sample-hold circuit 111 operates and the switch Sb is turned on, so that the second output voltage Vout2 of the output terminal of the charger power supply is obtained. Then, the switch Sb is turned off, and the capacitor C2 maintains the second output voltage Vout2 unchanged.

After the voltage sample-hold circuit 111 obtains the first output voltage Vout1 and the second output voltage Vout2, for example, in the time period T1 of the next cycle, the reference voltage superimpose circuit 112 operates and the switch Sc is turned on. The reference voltage superimpose circuit 112 generates the compensation value Vref of the reference voltage. The switches Sa and Sb are both turned off during the time period when the switch Sc is on.

Only the first output voltage Vout1, rather than the second output voltage Vout2, is obtained during the time period between the sampling time period of the first output voltage Vout1 and the successive sampling time period of the second output voltage Vout2. The voltage superimpose circuit 112 should stop operating during this time period. Thus, the switch Sc turns off during the time period ΔT1+T2 of each cycle, so that the voltage superimpose circuit 112 waits until the first output voltage Vout1 and the second output voltage Vout2 in the cycle are both completely sampled. When the switch Sc is off, the value Vout1−Vout2 is maintained the same by the capacitor C3 as the value Vout1−Vout2 just before the switch Sc turns off, so that the reference voltage superimpose circuit 112 maintains the compensation value Vref of the reference voltage in the previous cycle.

The voltage Vout of the output terminal of the charger power supply gradually increases and the output signal of the first differential amplifier GM1 gradually decreases as the constant-current charging process continues. Meanwhile, the output signal of the second differential amplifier GM2 maintains unchanged due to the constant-current charging. The loop switching control circuit 113 connects the voltage feedback loop to the feedback loop circuit to perform the constant-voltage charging when the first differential amplifier GM1 has an output signal less than that of the second differential amplifier GM2.

The charging current Iout of the output terminal of the charger power supply gradually decreases as the constant-voltage charging process continues. The charger power supply stops charging when the charging current Iout decreases to a predetermined value, that is generally 1/10 of the first current ICHG1 and Vout1>CV−REG−Vrecharge wherein Vrecharge is a predetermined value such as 100 mV.

Figure 7:
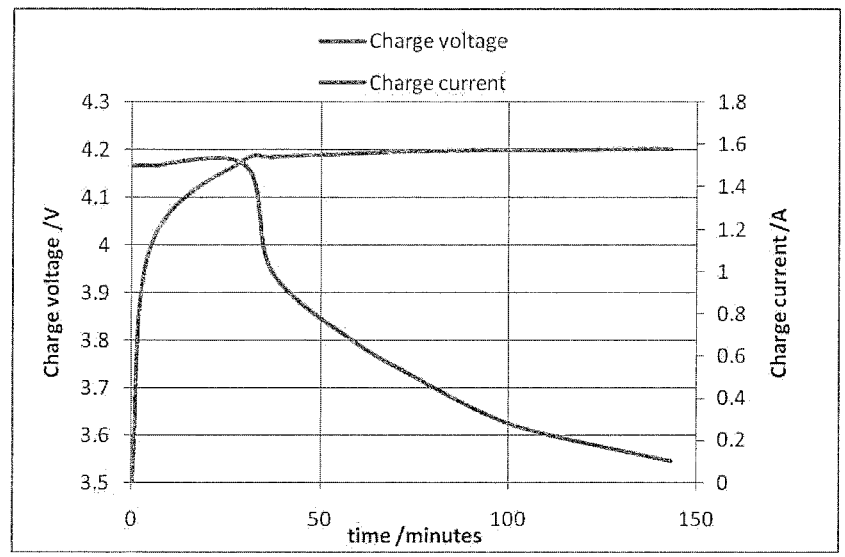
FIG. 7 is a curve diagram showing an output voltage and output current of the charger power supply changing in time at different stages of the charging process.

FIG. 7 is a curve diagram showing an output voltage and output current of the charger power supply varies with time at different processes of the charging procedure, a 3000 mA lithium rechargeable battery is taken as the example.

For the conventional charger power supply, the constant voltage charging process begins and then lasts for around 110 minutes after the constant current has been applied for about 30 minutes, herein the constant charging voltage is set to be 4.2V and the constant charging current is set to be 1.2 A. The whole charging process needs around 140 minutes, therefore the charging time of the method is overlong.

For the charger power supply according to the embodiment of the present disclosure, in which the compensation circuit 110 is used to compensate the line impendence and internal resistance of a battery, the second charging current is usually zero, so that a first charging process of the present invention is regarded as a constant-current charging process during which the charging current is the first current and a second process is regarded as a constant-voltage charging process. For example, the charging process begins and then lasts for around 40 minutes after the constant current has been applied for around 40 minutes, herein the constant current is set to be 1.5 A as same as its reference current and the constant voltage is set to be 4.2V. The whole process takes about 80 minutes of charging time, therefore the charging time is less than that in prior art by 60 minutes and the charging efficiency is improved by use of the method.

Figure 8:
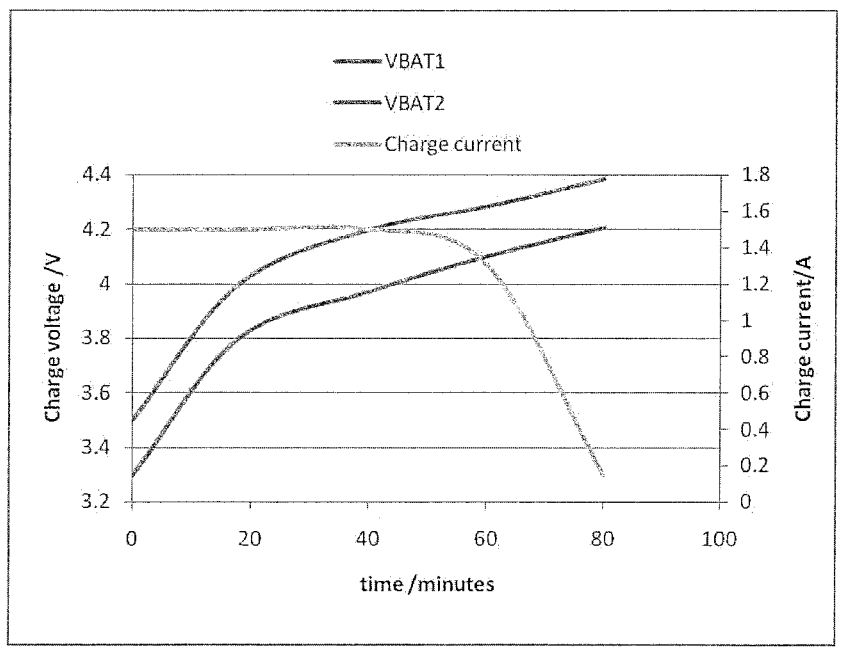
FIG. 8 is a curve diagram showing an output voltage of the charger power supply changing in time at different constant current values.

FIG. 8 is a curve diagram showing an output voltage of the charger power supply varies with time at different constant current, which respectively shows the output voltages Vout1 and Vout2 at the first current ICHG1 and the second current ICHG2. From the comparison of the two curve diagrams, the difference between the two output voltages Vout1 and Vout2 keeps at a substantially stable value during the charging process, the difference can represent the voltage drop of the line impedance and the internal resistance of a battery.

The above embodiments describe that the constant-current charging process of the charger power supply includes a plurality of time periods T1 of the first current and time periods T2 of the second current alternately. The voltage drop of the continuous time periods T1 and T2 is used to obtain the compensation voltage Vrc. In an alternative embodiment, the constant-current charging process may only include a time period T2 as long as the compensation voltage Vrc is kept long enough.

Further, the above embodiments describe the compensation circuit of the charger power supply, which superposes the compensation voltage on the reference voltage of the voltage feedback loop. In an alternative embodiment, the compensation circuit of the charger power supply can be connected between the output terminal OUT and differential amplifier GM1, and an additional differential amplifier is used to subtract the compensation voltage Vrc from the output voltage Vout.

Further, the above embodiments describe that the compensation circuit of the charger power supply receives the output voltage Vout which is obtained at the output terminal OUT of the charger power supply. As is known to those skilled in the art that a voltage detection module may be used to obtain a voltage feedback signal VV_sense representing the output voltage Vout. Therefore, in an alternative embodiment, the compensation circuit of the charger power supply receives the voltage feedback signal VV_sense, and generates a compensation voltage Vrc to compensate the line impedance and the internal resistance of a battery.

Reference has been made in detail to particular embodiments of the disclosure. It should be understood that they have been presented by way of example instead of the limitation on the protection scope of the present disclosure. The protection scope is defined by the attached claims and their equivalences. One skilled person will readily recognize that various modifications and changes may be made to the present disclosure, without departing from the true scope of the present disclosure.

What is claimed is:

1. A method for controlling a charger power supply comprises:
    performing a constant-current charging process by selecting a second output signal from a current feedback loop as a compensating signal, wherein said constant-current charging process includes a plurality of first time periods during which a first output current is provided and a plurality of second time periods during which a second output current is provided, alternately, and said first and second time periods in each cycle are preset time periods, and said second output signal is obtained by comparing said first output current with a second reference voltage in said plurality of first time periods and comparing said second output current with a third reference voltage in said plurality of second time periods; and
    performing a constant-voltage charging process by selecting a first output signal from a voltage feedback loop as said compensating signal when said first output signal is smaller than said second output signal, wherein said first output signal is obtained by comparing an output voltage of a charging power source with a first reference voltage,
    wherein said first reference voltage has a compensation value which corresponds to a difference between a first voltage corresponding to a first output voltage during said plurality of first time periods and a second voltage corresponding to a second output voltage during said plurality of said time periods, so that both a time point for switching from said constant-current charging process to said constant-voltage charging process and a value of said output voltage in said constant-voltage charging process are determined by said compensation value of said first reference voltage to compensate a voltage drop generated by line equivalent resistance and battery internal resistance.

2. A charger power supply configured to successively perform a constant-current charging process and a constant-voltage charging process in accordance with a compensation signal, wherein said constant-current charging process includes a plurality of first time periods during which a first output current is provided and a plurality of second time periods during which a second output current is provided, alternately, and said first and second time periods in each cycle are preset time periods, comprising:
   a current feedback loop comprising a second differential amplifier which obtains a second output signal by comparing said first output current with a second reference voltage in said plurality of first time periods and comparing said second output current with a third reference voltage in said plurality of second time periods; and
   a voltage feedback loop comprising a first differential amplifier which obtains a first output signal by comparing an output voltage of a charging power source with a first reference voltage;
   a loop selection circuit which selects one of said current feedback loop and said voltage feedback loop by selecting a smaller one of said second output signal and said first output signal as said compensation signal,
   wherein said first reference voltage has a compensation value which corresponds to a difference between a first voltage corresponding to a first output voltage during said plurality of first time periods and a second voltage corresponding to a second output voltage during said plurality of said time periods, so that both a time point for switching from said constant-current charging process to said constant-voltage charging process and a value of said output voltage in said constant-voltage charging process are determined by said compensation value of said first reference voltage to compensate a voltage drop generated by line equivalent resistance and battery internal resistance.

3. The charger power supply according to claim 2, wherein said first differential amplifier includes a non-inverting input terminal for receiving said compensation value of said first reference voltage, an inverting input terminal for receiving a third voltage corresponding to said output voltage in said constant-voltage charging process, and an output terminal for providing said first output signal.

4. The charger power supply according to claim 2, wherein said second differential amplifier includes a non-inverting input terminal for receiving one of said second reference voltage and said third reference voltage, an inverting input terminal for receiving a fourth voltage corresponding to one of said first output current and said second output current in said constant-current charging process, and an output terminal for providing said second output signal.

5. The charger power supply according to claim 2, wherein said selection circuit further comprises:

a first diode and a second diode, wherein a cathode of said first diode is connected with said output terminal of said first differential amplifier, a cathode of said second diode is connected with said output terminal of said second differential amplifier, and anodes of said first diode and said second diode are connected together to a common node to provide said compensation signal.

6. The charger power supply according to claim 2, further comprising:
   a voltage sample-hold circuit comprising a first branch circuit which samples and holds said first voltage corresponding to said first output voltage at said first output current, and a second branch circuit which samples and holds said second voltage corresponding to said second output voltage at said second output current, wherein said first and second branch circuits are both connected to said output terminal of said charger power supply; and
   a reference voltage superimpose circuit comprising a first voltage-controlled voltage source for obtaining a compensation voltage, and a second voltage-controlled voltage source for superimposing said first reference voltage on said compensation voltage.

7. The charger power supply according to claim 6, wherein
   said first branch circuit comprises a first switch being connected between said output terminal and a positive input terminal of said first voltage-controlled voltage source, and a first capacitor being connected between said positive input terminal of said first voltage-controlled voltage source and ground, said first capacitor stores said first voltage,
   said second branch circuit comprises a second switch being connected between said output terminal and a negative input terminal of said first voltage-controlled voltage source, and a second capacitor being connected between said negative input terminal of said second voltage-controlled voltage source and ground, said second capacitor stores said second voltage,
   said first voltage and said second voltage are respectively received by said positive input terminal and said negative input terminal of said first voltage-controlled voltage source, and a negative output terminal of said first voltage-controlled voltage source is grounded, so that said difference between said first voltage and said second voltage is obtained at a positive output terminal of said first voltage-controlled voltage source,
   said compensation voltage is received between said positive and negative input terminals of said second voltage-controlled voltage source, and said first reference voltage is received at a negative output terminal of said second voltage-controlled voltage source, so that said compensation value of said first reference voltage is obtained at a positive output terminal of a second voltage-controlled voltage source,
   said reference voltage superimpose circuit further comprises a third switch being connected between said positive output terminal of said first voltage-controlled voltage source and said positive input terminal of said second voltage-controlled voltage source, and a third capacitor being connected between said positive input terminal and said negative input terminal of said second voltage-controlled voltage source, said third capacitor stores said compensation voltage.

* * * * *